July 20, 1937  F. O. RICE  2,087,656
PROCESS FOR MAKING METALLO HYDROCARBON COMPOUNDS
Filed Aug. 31, 1931
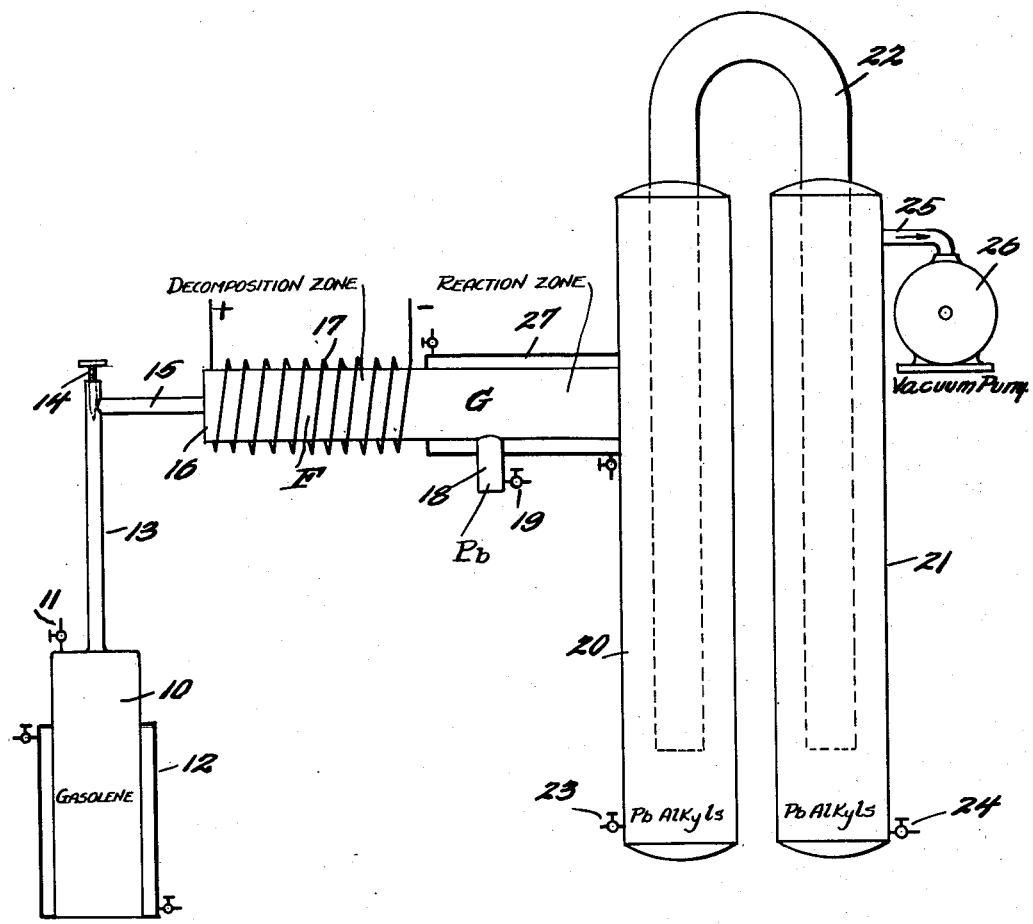
Inventor
Francis O. Rice,
By Watson, Cort, Morse & Brindle
Attorneys Patented July 20, 1937

2,087,656

UNITED STATES PATENT OFFICE 2,087,656

PROCESS FOR MAKING METALLO HYDROCARBON COMPOUNDS

Francis Owen Rice, Baltimore, Md., assignor to Standard Oil Company, Chicago, Ill., a corporation of Indiana Application August 31, 1931, Serial No. 560,517

8 Claims. (Cl. 260—11)

The present invention relates to processes for making metallo hydrocarbon compounds, and more particularly to such metallo hydrocarbon compounds as metal alkyls or aryls.

Briefly stated, the process according to the present invention comprises subjecting an organic compound capable of yielding upon decomposition a free radical to a temperature sufficient to decompose said material and liberate free radicals and contacting the decomposition products containing the free radicals with a metal to form a metallo hydrocarbon compound.

The organic compound capable of yielding upon decomposition a free radical employed may be either a material containing an aliphatic or an aromatic hydrocarbon depending upon whether an alkyl or aryl radical in a free state is desired. The organic compound may comprise a hydrocarbon of the paraffin series like heptane, ethane, propane, or butane, or higher hydrocarbons such for example as decane. Branched chain hydrocarbons such as iso-butane, may also be used or a substance containing a mixture of said hydrocarbons as for example petroleum ether, ligroin, gasolene, kerosene or gas oil. Unsaturated hydrocarbons such as propylene, butene-1, butene-2, iso-butylene, ethylene, or mixtures of these may be used. If desired, the organic compound may be an aldehyde like acetaldehyde, propionic aldehyde, hepaldehyde, a ketone like acetone, methylethyl ketone, dipropyl ketone or an ether like dimethyl ether, diethyl ether or a cyclic hydrocarbon such as cyclopentane, cyclohexane, methyl cyclohexane, acids such as acetic acid, propionic acid, or their esters, alcohols such as amyl alcohol. Aromatic organic compounds may also be used such as ethyl benzene.

The subjection of an organic compound capable of yielding upon decomposition a free radical to a temperature sufficient to decompose it and liberate free radicals may be effected in a number of ways. One method comprises passing the organic compound through a zone heated to a temperature above the decomposition point of the particular organic compound to be treated and maintained at such temperature. Preferably, the zone should be evacuated of air. If desired, the zone may or may not contain a suitable catalyst. The temperature at which the zone is maintained may range from 800° C. to 1000° C. but for some organic compounds the temperature may be lower or higher than that falling within this range, depending upon the decomposition point of the particular organic compound to be treated. For the best results it is desirable to so control the rate at which the organic compound is introduced into the decomposition zone and the decomposition products withdrawn therefrom that there is a rapid flow of the organic compound into and through the decomposition zone and the products out of said zone.

The metal employed may be any metal, as for example, lead, zinc, tin, bismuth, arsenic, antimony, cadmium, beryllium, etc. depending upon the specific organo metallic compound desired.

The decomposition products containing free radicals are contacted with the metal in such manner that the free radicals react or combine with the metal to form metallo hydrocarbon compounds in preference to recombining with each other to form inactive organic molecules. Since the radicals are capable of existence in the free state for only a very short time, which is of the order of hundredths of a second, it is necessary in order to obtain a good yield of the metallo hydrocarbon compound that the decomposition products be brought into contact with the metal almost immediately after their formation. This may be effected by having the reaction zone in which the free alkyl or aryl radicals are caused to combine with a metal adjoining the decomposition zone wherein the decomposition products containing the free radicals are formed, and causing decomposition products as they emerge from the decomposition zone to be immediately introduced into the reaction zone. The reaction zone should preferably have a free space of such cross sectional area as to offer no obstruction or retardation to the decomposition products passing therethrough, and also have the metal distributed about the free space of said zone. For the best results the reaction zone should be maintained at an elevated temperature but below the decomposition point of the metallo hydrocarbon compound being formed, the specific temperature varying with the particular metallo hydrocarbon compound to be produced.

The decomposition products containing the thus formed metallo hydrocarbon compound are withdrawn from the reaction zone and condensed, and the condensate then treated in any well known manner as by distilling to recover the metallo hydrocarbon compound in a substantially pure state.

The single figure in the accompanying drawing represents a diagrammatic showing of one form of an apparatus which may be used in carrying out the process of the present invention.

As a specific embodiment of the present invention the process for making lead alkyl will now be described in conjunction with the apparatus shown in the single figure of the drawing.

Referring to the drawing, the numeral 10 designates a container into which is introduced a substance containing a mixture of hydrocarbons of the paraffin series like gasolene through the inlet 11. The container is provided with a jacket 12 for the circulation of a suitable heating medium as steam or a cooling medium therethrough to heat or cool the contents of the container as desired. The top of the container is provided with a long narrow neck 13 in which is disposed a needle valve 14. The neck is connected by the pipe 15 to a tube 16 made, preferably, of refractory material which will withstand heating to extremely high temperatures and which is chemically inert with respect to the hydrocarbon to be treated and to the reaction products produced as for example, fused silica.

The tube comprises two portions designated F and G respectively. The portion F has a heating coil 17 disposed about the exterior surface thereof for heating it to the desired temperature, preferably to a temperature slightly above that at which the hydrocarbon capable of yielding upon decomposition a free radical decomposes into its components, for example 800° to 1000° C. This portion F constitutes what may be termed the decomposition zone.

The portion G is provided with a well 18 which is preferably disposed in the bottom wall of the tube and at a point adjacent to the decomposition zone. Into this well is introduced metallic lead through the inlet 19. In order that the lead used in the reaction may be in a readily available state it is preferred to charge the well with the metallic lead, and then subject the well to sufficient heat to distill the lead so that it will condense and be deposited as a film upon the walls of the portion G of the tube. The cross sectional area of the free space beyond the well 18 should be substantially the same as that of the portion F so that the decomposition products containing the free alkyl radicals pass through the portion G or reaction zone at the same rate as the hydrocarbon being decomposed traverses the decomposition zone. If desired, a suitable baffling material such as granular quartz, may be placed in that part of the portion G beyond the well 18 upon which the metallic lead as it is distilled condenses and thus provide a larger surface to the decomposition products containing the free alkyl radicals, but if this is done the diameter of the portion G of the tube should be increased so that the cross sectional area of the free space is not less than that of the free space of the portion G where no baffling material is placed in the tube. This portion of the tube constituting the reaction zone is preferably maintained during the reaction at any temperature above room temperature but below the temperature at which the lead alkyl being formed decomposes, for example, below 200° C. To cool the portion G to the desired temperature and maintain it at such temperature water is circulated through the jacket 27.

The portion G is connected to a trap 20 which in turn is in communication with another trap 21 through the conduit 22. The traps 20 and 21 are provided with tap off cocks or valves 23, and 24 respectively. The trap 20 is preferably cooled to a temperature of about minus 80° C. while the trap 21 is cooled to a much lower temperature, say minus 190° C. The trap 24 is connected by the conduit 25 to an oil pump 26 capable of producing a vacuum of at least 0.1 mm. of mercury.

In operation, the needle valve 14 is opened, and the apparatus completely exhausted of air by means of the oil pump 26. When all the air has been removed, the needle valve 14 is closed partially or to such an extent as to place the gasolene vapors at the point of introduction into the portion F or decomposition zone under the desired pressure, say about 2 to 4 mm. of mercury.

The gasolene vapors in passing through the decomposition zone or portion F of the tube are heated to a temperature above the decomposition point and are decomposed, the decomposition products containing free alkyl radicals. Such decomposition products then flow into the reaction zone or portion G of the tube and in passing therethrough the free alkyl radicals combine with the metallic lead distributed in such zone to form a mixture of lead alkyls.

The decomposition products containing the mixture of lead alkyls pass from the reaction zone or portion G of the tube into the traps 20 and 21 wherein they are condensed. The condensates which collect in both of the traps may be withdrawn through the cocks 23 and 24, and may be treated in any well known manner as by distillation to recover the lead alkyls therefrom.

Having thus described the invention, what is claimed as new and desired to be secured by Letters Patent is:

1. The process of making metallo hydrocarbon compounds which comprises subjecting an organic compound capable of yielding upon decomposition free radicals to a temperature sufficient to decompose said compound and liberate free radicals, and contacting the decomposition products containing free radicals with a metal to form metallo hydrocarbon compounds, the reaction being effected at a temperature above normal but below the decomposition point of the metallo hydrocarbon compounds to be formed.

2. The process of making metallo hydrocarbon compounds which comprises subjecting an organic compound capable of yielding upon decomposition free radicals in a substantial absence of air to a temperature sufficient to decompose said compound and liberate free radicals, and contacting the decomposition products containing free radicals with a metal in the substantial absence of air and at a temperature above normal but below the decomposition point of the metallo hydrocarbon compounds to be formed to form thereby metallo hydrocarbon compounds.

3. The process of making metallo hydrocarbon compounds which comprises subjecting an organic compound capable of yielding upon decomposition free radicals to a temperature sufficient to decompose said compound and liberate free radicals, distilling a metal, condensing the metal as a metallic film, and contacting said metal with the decomposition products containing free radicals to form metallo hydrocarbon compounds, the reaction being effected at a temperature above normal but below the decomposition point of the metallo hydrocarbon compounds to be formed.

4. The process of making metallo hydrocarbon compounds which comprises subjecting an organic compound capable of yielding upon decomposition free radicals in the substantial absence of air to a temperature sufficient to decompose said compound and liberate free radicals, distilling a metal, condensing the metal as a metallic film, and contacting said metal with the decomposition products containing the free radicals in the substantial absence of air, the reaction being effected at a temperature above normal but below the decomposition point of the metallo hydrocarbon compounds to be formed.

5. The process as in claim 1 wherein the free radicals are contacted with the metal under a reduced pressure of the order of two to four mm. of mercury.

6. The process as in claim 2 wherein the free radicals are contacted with the metal under a reduced pressure of the order of two to four mm. of mercury.

7. The process as in claim 3 wherein the free radicals are contacted with the metal under a reduced pressure of the order of two to four mm. of mercury.

8. The process as in claim 4 wherein the free radicals are contacted with the metal under a reduced pressure of the order of two to four mm. of mercury.

FRANCIS OWEN RICE.